Nov. 6, 1934.      E. WEISSE      1,979,719
PHOTOGRAPHIC CAMERA
Filed March 1, 1933      2 Sheets-Sheet 1
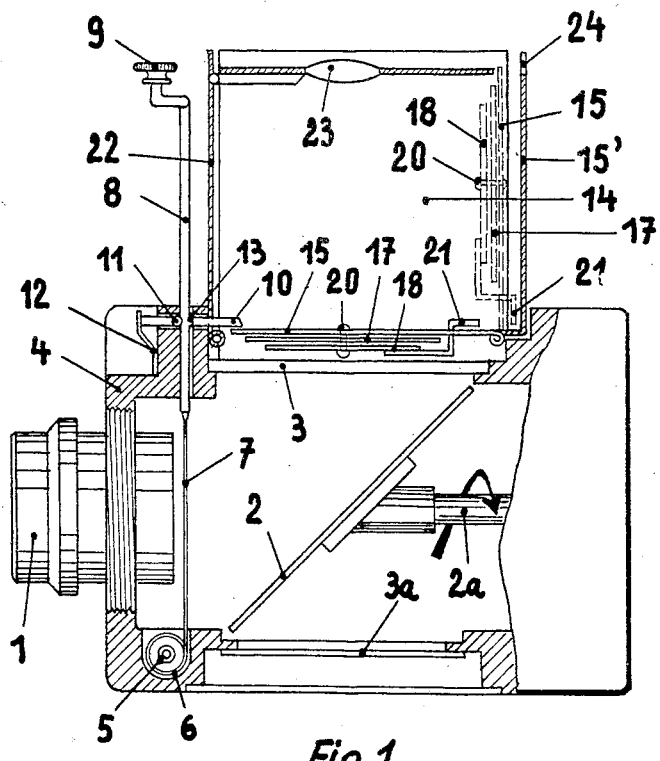
Fig. 1
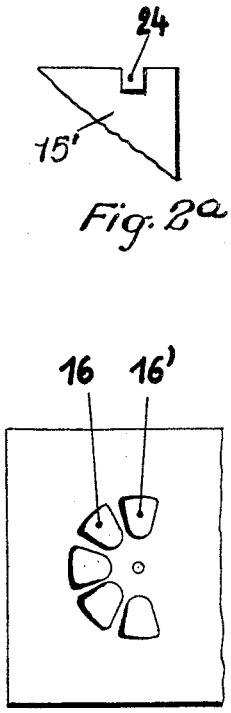
Fig. 2a
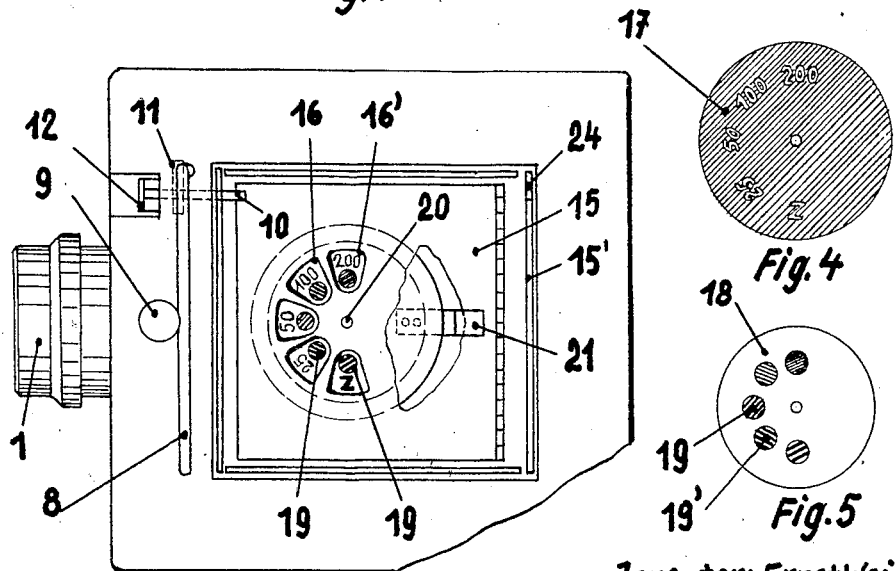
Fig. 2
Fig. 3
Fig. 4
Fig. 5
Inventor: Ernst Weisse
by Karl Viertel
Attorney.

Nov. 6, 1934.  E. WEISSE  1,979,719
PHOTOGRAPHIC CAMERA
Filed March 1, 1933  2 Sheets-Sheet 2
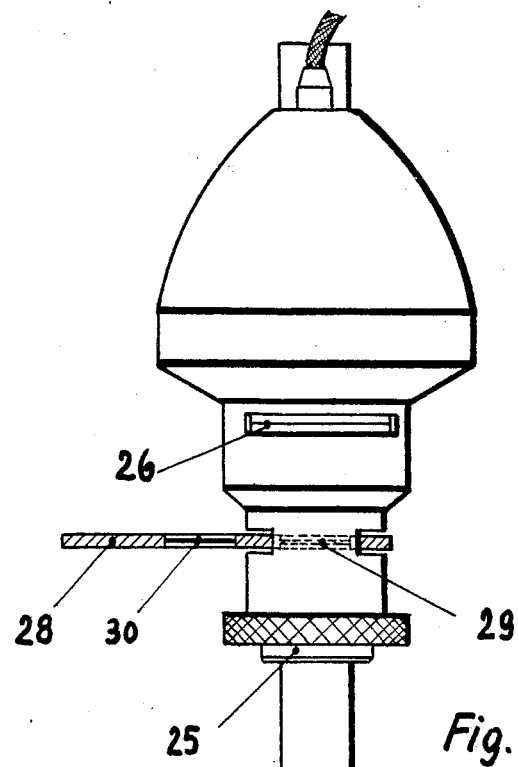
Fig. 6
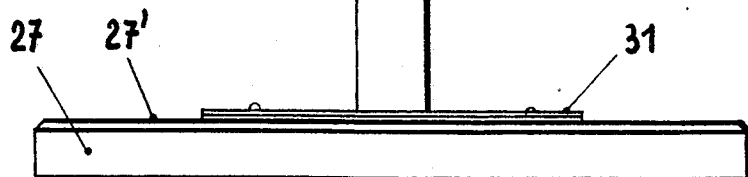
Fig. 7
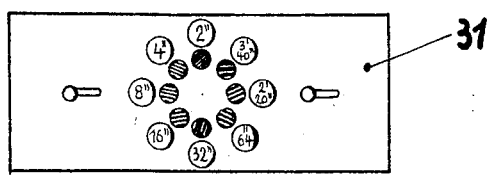
Fig. 7a
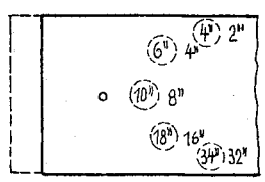
Inventor: Ernst Weisse
by
Karl Viertel
Attorney Patented Nov. 6, 1934

1,979,719

UNITED STATES PATENT OFFICE 1,979,719

PHOTOGRAPHIC CAMERA

Ernst Weisse, Leipzig, Germany

Application March 1, 1933, Serial No. 659,118
In Germany February 17, 1932

12 Claims. (Cl. 88—23)

My invention relates to improvements in photographic cameras for taking photographs and for enlarging pictures in which the image is thrown on to an observation screen prior to the exposure—and more especially to improvements in accessorial equipments of photographic cameras designed for determining the appropriate duration of the exposure required with regard to various intrinsic factors including the photogenic intensity of the light, optical characteristics of the light projecting means of the camera and of a colored diaphragm used therein, the sensitiveness of the photographic medium—plate, film, paper on which the image is thrown etc.

In bygone years photographic cameras were known and used which were provided with exposure meters, known also as "actinometers", attached to the camera proper outside thereof; nowadays however, as far as I have observed, those cameras are seldom used, the exposure measuring instrument being preferably carried and used by the photographer separately from the camera.

As a matter of fact known to practitioners the measuring operation with instruments of the type concerned often causes considerable delay and seriously impairs the readiness of the operator for taking the photograph, more especially in cases where the duration of the exposure cannot be read directly in or on the instrument but must be calculated by the aid of other scales of indicating marks, numbers etc. computed with reference to a particular sensitiveness of the photographic medium and other intrinsic factors.

Also in enlarging pictures with photographic cameras considerable delay is caused by those preliminary tests which must be made for roughly determining the appropriate duration of the exposure; said tests are mostly empirically made with a strip of sensitive paper, consecutive sections of which are first successively exposed for equal periods of time—say 5 seconds—in such manner that the section first exposed is that which has been longest exposed to the rays of light of the enlarging camera,—say 20 seconds, the next section 15 seconds and so on; thereafter the said strip of paper is developed and—by discriminatingly reviewing all the sections exposed and selecting the section on which the enlarged picture is best seen, the appropriate duration exposure is ascertained—after all a rather tiresome procedure.

For cutting short the exposure measuring operations necessary in enlarging pictures a great many apparatus having various structural features have been invented, most of which however are too expensive or too complicated for the average amateur photographer.

The primary object of this invention is to overcome the drawbacks inherent to exposure meters known and used heretofore for the purposes indicated, by providing an improved exposure measuring equipment of simple design which is not subject to loss, being structurally and organically combined with the camera proper and which is to be handled jointly with the latter.

In connection therewith the invention aims at so redesigning the exposure measuring equipment of the camera that the exposure can be directly and instantaneously read on one and the same dial also with reference to photographic media of different sensitiveness.

Other objects of the invention will become incidentally apparent to practitioners hereinafter.

The nature and scope of the invention are briefly outlined in the appended claims and will be more fully understood by the following specification read together with the accompanying drawings in which Fig. 1 is a diagrammatical side elevation of a camera for taking photographs shown by way of an example and equipped with an exposure measuring device according to this invention, Fig. 2 is a plan of the camera shown in Fig. 1, Fig. 2a is a fragmentary view of the rear wall of the focussing hood of the camera, Figs. 3–5 show the principal component parts of the exposure measuring device, Fig. 6 is a front elevation of a photographic camera for enlarging pictures shown by way of an example, Figs. 7 and 7a are plans used in connection with enlarging cameras.

The basic idea underlying my invention was to so structurally re-design and equip the photographic camera with appropriate optical measuring means built in and organically combined with the camera that the latter itself is turned into and can be used temporarily—viz. prior to the exposure—as an exposure measuring and indicating apparatus of great accuracy.

This object is attained with both photographic cameras shown in the drawings by way of examples—as will be more fully explained hereinafter—by dispersing temporarily the light rays of the image to be photographed or enlarged, and measuring concurrently the average photogenic power of the dispersed light rays of the image on the usual observation screen of the camera, which may be a translucent ground glass plate 3 as in the case of a reflex camera shown in Figs. 1–5, and which may be a simple screen or any image receiving surface acted upon by the light rays passing through the objective 25 of an enlarging camera shown in Fig. 6.

In the course of my experimental work I have tried to measure the degree of brightness of an image thrown by the objective of the camera on to a screen, a ground glassplate or the like in order to determine thereby the appropriate duration of the exposure.

The difficulties arising therein are chiefly due to the fact that the image is composed of brighter and darker sections which respond differently in the measuring operation thus furnishing different values of measurement. I have eliminated these difficulties by simply measuring the average or mean brightness of the image which is obtained according to this invention by dispersing the rays of light of which the image is composed.

I have found that a series of graduated observation marks, if placed on the observation screen of the camera is a very convenient and handy means for measuring the mean brightness of the dispersed image: According to the greater or smaller brightness of the latter a certain number of the graduated observation marks will be clearly visible, while some of them may disappear. By assigning to each of the graduated observation marks an individual exposure—value given in seconds and fractions thereof and exhibited on a dial cooperatively connected with the carrier of the said observation marks, the duration of the exposure consistent with the respective mean brightness of the image under consideration can be directly and instantaneously read on the said dial, viz. at the mark which is the last one of those that are clearly visible.

The reading of the exposure value can be facilitated by viewing the dial and the observation marks through a magnifying glass.

According to this invention the exposure values assigned the individual graduated observation marks can be changed in one or more steps by changing the cooperative position of the carrier of observation marks relatively to their dial or vice versa.

In this simple manner the measurement can be readily re-adjusted to photographic media of different sensitiveness, for instance hard, medium and soft kinds of sensitive paper used in enlarging pictures, or of flexible films used in taking snap shots.

How my invention has been reduced into and is applied in practice will now be described more in detail with reference to the cameras shown in the drawings by way of examples:

1 designates the objective of a reflex camera shown in Figs. 1—2; the image is reflected by mirror 2 onto the observation screen 3; after the duration of exposure has been measured by the camera equipment, described hereinafter more in detail, the mirror 2 is rotated through an angle of 180°, shortly prior to the exposure, by a rotary spindle 2a and automatic actuating means—not shown—and forming no part of this invention. The exposure is made by means known per se, while the image is thrown on a sensitive flexible film diagrammatically indicated at 3a and being wound up on rollers (not shown).

The exposure measuring equipment of the camera comprises a translucent flexible blind 7 of the nature of oil paper, parchment, tracing linen or the like, capable of dispersing light rays and being wound up on a spring actuated roller 5, 6 which is rotatably mounted in the camera casing 4.

The outer end of the blind 7 is fastened at the forked end of a yoke 8 having a handle 9 by which the blind can be pulled into its working position shown in Fig. 1. The arms of the yoke are so wide apart as to provide an unobstructed passage for the light rays when the yoke is inside the camera casing.

A detent 10, actuated by spring 12 and being slidably mounted in the upper part of the camera casing is cooperatively associated with the yoke 8, one arm of which being formed with a curved recess 13 which in the upper position of the yoke 8 engages a pin 11 laterally extending from the detent 10 in such manner that the bevelled point of detent 10 is pushed ahead by spring 12 so as to detain the exposure measuring device proper when the latter is swung into its operative position shown in full lines in Fig. 1.

The exposure measuring device is hinged at the bottom of the rear wall 15' of a focussing hood 14. As seen in Figs. 1, 2 and 2a said rear wall 15 is indented at 24 so as to be out of contact with the detent 10, when the hood is folded down into its inoperative position. Said hood consists of four hinged, spring actuated walls and is adapted to unfold automatically after a catch—not shown—has been released.

The exposure measuring device consists of an opaque carrier plate 15 which is formed with a plurality of apertures or windows 16, 16' (Fig. 3) through which the dial 17 (Fig. 4) and the measuring film proper 18 (Fig. 5) are visible, which are pivotally mounted on the carrier plate 15 by means of a pin 20. A small handle 21 is attached to the measuring film 18 by which the latter can be swung in steps around pin 20 in order to be brought into proper record with the dial 17 in different relative positions to the latter viz. with regard to photographic films 3a of different sensitiveness used in the camera.

I prefer to use as dial 17 a smoked film in which fully transparent symbols and numbers—for instance letter Z indicating "time" and numbers 25, 50, 100, 200 indicating exposures of 1/25, 1/50, 1/100, 1/200 of a second—are clearly visible.

The measuring film 18, which is preferably transparent, is provided with a series of graduated observation marks 19, 19' (Fig. 5), which are composed in the embodiment of the invention shown by way of example of spaced lines of different width, viz. the latter being narrow and narrower from mark to mark.

In order to facilitate the observation of the measuring film 18 and the dial 17 a magnifying glass 23 may be used to advantage provided in an opaque blind which is hinged at the front wall 22 of the focussing hood 14. By said blind any intrusive light which may interfere is kept out.

When using the measuring device the rear wall 15' of the hood 14 is swung down by the operator's finger touching the said rear wall from behind, whereby the measuring device is concurrently swung down until it reaches the detent 10.

It will be noted in Fig. 1 that the rear wall 15' has a recess 24 which allows the rear wall 15' to freely pass the detent 10, without being caught by the latter, and to return into its upright operative position, while the measuring device alone is retained by detent 10 and will remain in its lower position.

As described above more in detail the duration of the exposure can be measured and directly read on the dial 17 with the aid of the graduated marks 19, 19':

For instance in case the first 3 marks, to which the symbol Z and the numbers 25, and 50 are assigned, are clearly visible viz. the lines of those marks being distinguishable the exposure would have to be 1/50 of a second.

After the exposure has been measured the focussing hood is folded down and the blind 7 wound up on its spring actuated roller 6 by pushing home the yoke 8.

My invention is readily applicable to other types of photographic cameras having an observation screen on to which the real image is thrown prior to the exposure, as will be explained with reference to Figs. 6 and 7.

The photographic enlarging apparatus, diagrammatically shown by way of an example in Fig. 7 and having an electric lamp in its upper bowl, is provided with a slide 28 having an open window 29 and a blind 30 of translucent, light dispersing material, e. g. ground glass; said slide being movably arranged in the camera casing between the objective 25 and the picture carrier 26.

While slide 28 is in the position shown in Fig. 7 the full light of the enlarged picture is thrown onto the upper face 27' of the base plate 27 of the apparatus, whereafter the blind 30 is placed into the passage of the light rays which then will reach the observation screen 27' in a state of diffusion and dispersion.

In order to measure the exposure the measuring device 31 is placed on base plate 27; the measuring device is of substantially the same design as that described above in connection with the reflex camera: As seen in Fig. 7 a number of graduated marks composed of spaced lines of different width are visible on a film, say a sheet of cardboard or the like, the latter having windows close to each mark through which the symbols and numbers of the dial sheet underneath are visible.

Both sheets are slidably interconnected by means of pins and slots so that the graduated observation marks can be brought into record with different symbols and numbers on the dial in order to cope with varying factors, such as different candle power of the working light, different degree of sensitiveness of the copying paper under treatment etc.

It will be noted that the measuring device used in connection with enlarging apparatus is designed for being used in reflected light viz. reflected from the observation screen, while with the other type of measuring device described with reference to the reflex camera the graduated marks and the dial are seen in transient light. In both cases the camera proper is an organic part of the exposure measuring equipment and vice versa.

Various changes and modifications in the design of photographic cameras having the improvements indicated above may suggest themselves to practitioners in this field without substantially departing from the spirit and the salient ideas of my invention:

For instance the graduated marks 19, 19' may be obviously composed of dots, squares, chequered designs etc. instead of lines.

What I claim is:

1. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image.

2. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said light dispersing means comprising a flexible screen of translucent material, a roller mounted in the camera on which the said screen is wound up and screen operating means under the control of the photographer for unwinding the screen retaining it in its operative position and restoring it into its inoperative position.

3. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said light dispersing means comprising a flexible screen of translucent material, a roller mounted in the camera on which the said screen is wound up and screen operating means under the control of the photographer for unwinding the screen, retaining it in its operative position and restoring it into its inoperative position, said screen operating means including a yoke and handle attached to said screen, a spring actuated detent cooperatively associated with said handle and the camera structure and a spring attached to said roller for revolving the latter on winding up the said screen.

4. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said light dispersing means comprising a slide slidably mounted in the camera and capable of being manually operated from without the camera, said slide having an open window for the unobstructed passage of the image forming light rays and, adjacent thereto, an aperture closed by a screen of translucent material.

5. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said optical exposure indicating means comprising a plurality of observation marks arranged on a carrier element and being progressively graduated as to their distinguishment by the human eye under different conditions of illumination consistent with the said substitute image, and a dial indicating the exposure periods, which are individually assigned to the said observation marks, and being cooperatively associated with the latter.

6. In a photographic camera an object lens for projecting an image, an observation screen on which the said image is visible to the operator and an exposure meter which is cooperatively associated with both the said object lens and the observation screen, and which comprises light dispersing means, capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said optical exposure indicating means comprising a plurality of observation marks arranged side by side in a circle on a carrier element and being progressively graduated as to their distinguishment by the human eye under different conditions of illumination consistent with the said substitute image, and a dial indicating the exposure periods, which are individually assigned to the said observation marks, said dial being adjustably associated with the latter for changing step by step the exposures indicated with reference to photographic media of different sensitiveness to be used with reference to the image projected by the object lens.

7. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said optical exposure indicating means comprising a plurality of observation marks arranged on a carrier element and being progressively graduated as to their distinguishment by the human eye under different conditions of illumination consistent with the said substitute image and a dial indicating the exposure periods which are individually assigned to the said observation marks, and being cooperatively associated with the latter, said observation marks being composed of highly contrasting elements, including lines of different width and being differently spaced from each other.

8. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said optical exposure indicating means comprising a plurality of observation marks arranged side by side in a circle on a carrier element and being progressively graduated as to their distinguishment by the human eye under different conditions of illumination consistent with the said substitute image, and a dial indicating the exposure periods, which are individually assigned to the said observation marks, said dial being pivotally associated with the latter for changing step by step the exposures indicated with reference to photographic media of different sensitiveness to be used with reference to the image projected by the object lens.

9. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said optical exposure indicating means comprising a plurality of observation marks arranged on a carrier element and being progressively graduated as to their distinguishment by the human eye under different conditions of illumination consistent with the said substitute image and a dial indicating the exposure periods which are individually assigned to the said observation marks, and being cooperatively associated with the latter, said dial presenting transparent exposure indicating symbols provided within a translucent carrier element, including a smoked film.

10. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, said exposure indicating means being hinged to the camera so as to be capable of being swung into and out of its operative position.

11. In a photographic camera an object lens for projecting an image, an observation screen on which the said image is visible to the operator and an exposure meter which is cooperatively associated with both the said object lens and the observation screen, and which comprises light dispersing means, capable of being temporarily thrown into the path of the light rays projected by the object lens onto the observation screen so as to produce on the latter a substitute image of diffuse nature, and optical exposure indicating means capable of being concurrently associated cooperatively with the said substitute image, said exposure indicating means being hinged to the camera and being cooperatively associated with a spring actuated detent under the control of the operator so as to be capable of being swung into its operative position and being automatically retained therein.

12. In a photographic camera an object lens for projecting an image, an observation screen on which the said image is visible to the operator and an exposure meter which is cooperatively associated with both the said object lens and the observation screen, and which comprises light dispersing means capable of being temporarily thrown into the path of the light rays projected by the object lens onto the observation screen so as to produce on the latter a substitute image of diffuse nature, and optical exposure indicating means capable of being concurrently associated cooperatively with the said substitute image, the said optical exposure indicating means comprising a plurality of observation marks arranged side by side in a circle on a carrier element and being progressively graduated as to their distinguishment by the human eye under different conditions of illumination consistent with the said substitute image, and a dial indicating the exposure periods which are individually assigned to the said observation marks, said dial being slidably associated with the latter for changing step by step the exposures indicated with reference to photographic media of different sensitiveness to be used with reference to the image projected by the object lens.

ERNST WEISSE.